US012794607B2

(12) United States Patent
Berg et al.

(10) Patent No.: US 12,794,607 B2
(45) Date of Patent: Nov. 10, 2026

(54) DETERMINING A RELATION BETWEEN TIME-DOMAIN SIGNALS BASED ON FREQUENCY DOMAIN COEFFICIENTS

(71) Applicant: Telefonaktiebolaget LM Ericsson (publ), Stockholm (SE)

(72) Inventors: Miguel Berg, Sollentuna (SE); Chenguang Lu, Sollentuna (SE); Per Ola Börjesson, Mörrum (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 299 days.

(21) Appl. No.: 18/690,860

(22) PCT Filed: Sep. 17, 2021

(86) PCT No.: PCT/SE2021/050897
§ 371 (c)(1),
(2) Date: Mar. 11, 2024

(87) PCT Pub. No.: WO2023/043348
PCT Pub. Date: Mar. 23, 2023

(65) Prior Publication Data
US 2024/0380528 A1 Nov. 14, 2024

(51) Int. Cl.
*H04L 5/00* (2006.01)
*H04B 7/08* (2006.01)
*H04W 72/044* (2023.01)

(52) U.S. Cl.
CPC ......... *H04L 5/0005* (2013.01); *H04B 7/0854* (2013.01); *H04W 72/044* (2013.01)

(58) Field of Classification Search
None
See application file for complete search history.

(56) References Cited

U.S. PATENT DOCUMENTS 4,876,549 A * 10/1989 Masheff .................... G01S 3/46
342/194
7,421,015 B2 9/2008 Sedarat
(Continued)

FOREIGN PATENT DOCUMENTS

| | | | |
|---|---|---|---|
| JP | 2017216499 | A | 12/2017 |
| KR | 20170126305 | A | 11/2017 |
| WO | 2023041440 | A1 | 3/2023 |

OTHER PUBLICATIONS

International Search Report and Written Opinion for International Patent Application No. PCT/SE2021/050897, mailed Jun. 21, 2022, 10 pages.

(Continued)

*Primary Examiner* — Anh Vu H Ly
(74) *Attorney, Agent, or Firm* — Withrow & Terranova, PLLC

(57) ABSTRACT

A method for determining a relation between a first time-domain signal and a second time-domain signal received from a single source is provided. The time domain signals are respectively processed with a Fourier-related transform to indirectly or directly provide respective first and second frequency-domain signals being made up of frames. Only one part from the Fourier-related transform is included. A first part is the part that is included and a second part is the other part. The method comprises the steps of: receiving the frequency-domain signals; determining a first part cross-correlation by cross-correlating corresponding frames in the first frequency-domain signal and the second frequency-domain signal, for the first part; and determining a second part cross-correlation by cross-correlating non-corresponding frames in the first frequency-domain signal and the second frequency-domain signal, for the second part.

20 Claims, 4 Drawing Sheets

(56) References Cited

U.S. PATENT DOCUMENTS

| | | | | |
|---|---|---|---|---|
| 7,623,578 | B2 | 11/2009 | Pisoni et al. | |
| 8,031,119 | B1 * | 10/2011 | Francis | G01S 3/74<br>342/444 |
| 9,967,807 | B2 * | 5/2018 | Pu | H04W 24/08 |
| 10,175,335 | B1 * | 1/2019 | Stefanakis | G01S 3/802 |
| 2008/0069252 | A1 * | 3/2008 | Wenzhen | H04L 27/2665<br>375/260 |
| 2017/0090009 | A1 | 3/2017 | Amishima et al. | |
| 2019/0052500 | A1 * | 2/2019 | Choi | H04B 1/707 |
| 2020/0013420 | A1 * | 1/2020 | Wallace | G10L 19/0216 |
| 2020/0177417 | A1 * | 6/2020 | Tangudu | H04B 1/30 |
| 2023/0180165 | A1 | 6/2023 | Su et al. | |
| 2025/0141531 | A1 * | 5/2025 | Berg | H04B 7/084 |

OTHER PUBLICATIONS

International Search Report and Written Opinion for International Patent Application No. PCT/EP2022/075136, mailed Nov. 22, 2022, 10 pages.

Fraunhofer Iis, et al., "R1-1911207: Remaining Details on Uplink PRS Signal Design," 3GPP TSG RAN WG1 Meeting #98-Bis, Oct. 14-20, 2019, Chongqing, China, 14 pages.

Request for the Submission of an Opinion for Korean Patent Application No. 10-2024-7008085, mailed Dec. 22, 2025, 13 pages.

Examination Report for European Patent Application No. 21790582.7, mailed Mar. 25, 2026, 4 pages.

Examination Report for European Patent Application No. 22782480.2, mailed Mar. 31, 2026, 6 pages.

* cited by examiner

DETERMINING A RELATION BETWEEN TIME-DOMAIN SIGNALS BASED ON FREQUENCY DOMAIN COEFFICIENTS

This application is a 35 U.S.C. § 371 national phase filing of International Application No. PCT/SE2021/050897, filed Sep. 17, 2021, the disclosure of which is incorporated herein by reference in its entirety.

TECHNICAL FIELD

The present disclosure relates to the field of digital signal comparison and in particular to determining a relation between time-domain signals based on frequency domain coefficients of only one part (real or imaginary).

BACKGROUND

In many situations, it is useful to determine a relation between two received wireless signals. For instance, time, phase and/or power differences between multiple received signals from a single source can be used to determine a position, or to enable coherent combining (e.g. equal-gain or maximal ratio combining) of the multiple received signals.

One known method of determining a relation between signals is to perform a cross-correlation between two (or more) received signals from the same source. Such correlation can be calculated in the time domain using the definition of cross-correlation. Also, this calculation can be performed in the frequency domain, in a more computational efficient manner.

However, when data compression is applied in a fronthaul link from a reception point to an aggregation point such that one part (real or imaginary) is included on the fronthaul link, complex number cross-correlation is not readily available, other than transforming back to the time domain and performing cross-correlation based on the time-domain signal or yet another transform to the frequency domain. Such a solution requires a lot of resources.

SUMMARY

One object is to enable complex cross-correlation in the frequency domain, even when one part (real or imaginary) of the frequency-domain signal is not available.

According to a first aspect, it is provided a method for determining a relation between a first time-domain signal and a second time-domain signal received from a single source by different antennas. The time domain signals are respectively processed with a Fourier-related transform with overlapping input frames to indirectly or directly provide respective first and second frequency-domain signals being made up of frames of frequency-domain coefficients. Only one part, of the real part and the imaginary part from the Fourier-related transform, is included in the frequency-domain signals. A first part is the part, real or imaginary, that is included in the frequency-domain signals and a second part is the part, real or imaginary, that is not included in the frequency-domain signals. The method is performed by a relation determiner. The method comprises the steps of: receiving the first frequency-domain signal and the second frequency-domain signal; determining a first part cross-correlation between the first frequency-domain signal and the second frequency-domain signal by cross-correlating corresponding frames in the first frequency-domain signal and the second frequency-domain signal, for the first part; and determining a second part cross-correlation between the first frequency-domain signal and the second frequency-domain signal by cross-correlating non-corresponding frames in the first frequency-domain signal and the second frequency-domain signal, for the second part.

In the determining a second part cross-correlation step, the cross-correlation may be performed for frames where the frame in the first frequency-domain signal is one frame ahead of the frame in the second frequency-domain signal, and/or vice versa.

The method may further comprise the step of: determining a time difference, phase difference, or power ratio, between the first frequency-domain signal and the second frequency-domain signal based on the first part cross-correlation and the second part cross-correlation.

The method may further comprise the step of: determining a position of the single source based on at least one of the time difference, phase difference and power ratio.

The method may further comprise the step of: performing signal combining based on at least one of the time difference, phase difference and power ratio.

The method may further comprise the step of: selecting bins and frames to use for the first part cross-correlation and second part cross-correlation based on bins and frames assigned for a particular user.

The method may further comprise the step of: determining one of the received frequency-domain signals to be used as a reference signal.

The step of receiving may comprise receiving the first frequency-domain signal, the second frequency-domain signal and a third frequency-domain signal. Furthermore, the steps of determining a first part cross-correlation and determining a second part cross-correlation may comprise cross-correlating each one of the frequency-domain signals that is not the reference signal against the reference signal.

The step of determining a reference signal may comprise determining the reference signal to be the one of the frequency-domain signals that has the greatest received signal power.

The step of determining a reference signal may comprise determining the reference signal to be the one of the frequency-domain signals that has the most concentrated auto-correlation or the flattest spectrum.

The method may further comprise the step of: normalising the first part cross-correlation and the second part cross-correlation on a bin-by-bin basis.

The step of normalising may be performed equally for the first part cross-correlation and the second part cross-correlation.

The method may further comprise the step of: scaling the first part cross-correlation and/or the second part cross-correlation to enable time-domain alias cancellation.

The step of receiving the first frequency-domain signal and the second frequency-domain signal may comprise receiving the first frequency-domain signal from a first reception device and the second frequency-domain signal from a second reception device.

According to a second aspect, it is provided a relation determiner for determining a relation between a first time-domain signal and a second time-domain signal received from a single source by different antennas. The time domain signals are respectively processed with a Fourier-related transform with overlapping input frames to indirectly or directly provide respective first and second frequency-domain signals being made up of frames of frequency-domain coefficients. Only one part, of the real part and the imaginary part from the Fourier-related transform, is included in the frequency-domain signals. A first part is the part, real or imaginary, that is included in the frequency-domain signals and a second part is the part, real or imaginary, that is not included in the frequency-domain signals. The relation determiner comprises: a processor; and a memory storing instructions that, when executed by the processor, cause the relation determiner to: receive the first frequency-domain signal and the second frequency-domain signal; determine a first part cross-correlation between the first frequency-domain signal and the second frequency-domain signal by cross-correlating corresponding frames in the first frequency-domain signal and the second frequency-domain signal, for the first part; and determine a second part cross-correlation between the first frequency-domain signal and the second frequency-domain signal by cross-correlating non-corresponding frames in the first frequency-domain signal and the second frequency-domain signal, for the second part.

The relation determiner may further comprise instructions that, when executed by the processor, cause the relation determiner to perform the cross-correlation for the second part for frames where the frame in the first frequency-domain signal is one frame ahead of the frame in the second frequency-domain signal, and/or vice versa.

The relation determiner may further comprise instructions that, when executed by the processor, cause the relation determiner to: determine a time difference, phase difference, or power ratio, between the first frequency-domain signal and the second frequency-domain signal based on the first part cross-correlation and the second part cross-correlation.

The relation determiner may further comprise instructions that, when executed by the processor, cause the relation determiner to: determine a position of the single source based on at least one of the time difference, phase difference and power ratio.

The relation determiner may further comprise instructions that, when executed by the processor, cause the relation determiner to: perform signal combining based on at least one of the time difference, phase difference and power ratio.

The relation determiner may further comprise instructions that, when executed by the processor, cause the relation determiner to: select bins and frames to use for the first part cross-correlation and second part cross-correlation based on bins and frames assigned for a particular user.

The relation determiner may further comprise instructions that, when executed by the processor, cause the relation determiner to: determine one of the received frequency-domain signals to be used as a reference signal.

The instructions to receive may comprise instructions that, when executed by the processor, cause the relation determiner to receive the first frequency-domain signal, the second frequency-domain signal and a third frequency-domain signal. Furthermore, the instructions to determine a first part cross-correlation and determine a second part cross-correlation may comprise instructions that, when executed by the processor, cause the relation determiner to cross-correlate each one of the frequency-domain signals that is not the reference signal against the reference signal.

The instructions to determine a reference signal may comprise instructions that, when executed by the processor, cause the relation determiner to determine the reference signal to be the one of the frequency-domain signals that has the greatest received signal power.

The instructions to determine a reference signal may comprise instructions that, when executed by the processor, cause the relation determiner to determine the reference signal to be the one of the frequency-domain signals that has the most concentrated autocorrelation or the flattest spectrum.

The relation determiner may further comprise instructions that, when executed by the processor, cause the relation determiner to: normalize the first part cross-correlation and the second part cross-correlation on a bin-by-bin basis.

The relation determiner may further comprise instructions that, when executed by the processor, cause the relation determiner to perform the instructions to normalize equally for the first part cross-correlation and the second part cross-correlation.

The relation determiner may further comprise instructions that, when executed by the processor, cause the relation determiner to: scale the first part cross-correlation and/or the second part cross-correlation to enable time-domain alias cancellation.

The relation determiner may further comprise instructions that, when executed by the processor, cause the relation determiner to receive the first frequency-domain signal from a first reception device and the second frequency-domain signal from a second reception device.

According to a third aspect, it is provided a computer program for determining a relation between a first time-domain signal and a second time-domain signal received from a single source by different antennas. The time domain signals are respectively processed with a Fourier-related transform with overlapping input frames to indirectly or directly provide respective first and second frequency-domain signals being made up of frames of frequency-domain coefficients. Only one part, of the real part and the imaginary part from the Fourier-related transform, is included in the frequency-domain signals. A first part is the part, real or imaginary, that is included in the frequency-domain signals and a second part is the part, real or imaginary, that is not included in the frequency-domain signals. The computer program comprises computer program code which, when executed on a relation determiner causes the relation determiner to: receive the first frequency-domain signal and the second frequency-domain signal; determine a first part cross-correlation between the first frequency-domain signal and the second frequency-domain signal by cross-correlating corresponding frames in the first frequency-domain signal and the second frequency-domain signal, for the first part; and determine a second part cross-correlation between the first frequency-domain signal and the second frequency-domain signal by cross-correlating non-corresponding frames in the first frequency-domain signal and the second frequency-domain signal, for the second part.

According to a fourth aspect, it is provided a computer program product comprising a computer program according to the third aspect and a computer readable means comprising non-transitory memory in which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
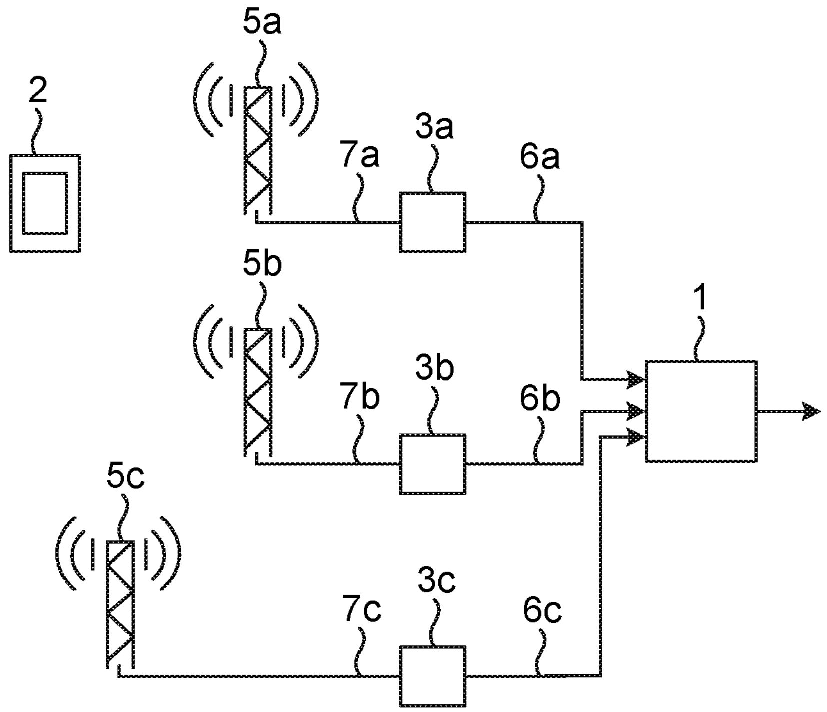
FIG. 1 is a schematic diagram illustrating an environment in which embodiments presented herein can be applied.

FIG. 1 is a schematic diagram illustrating an environment in which embodiments presented herein can be applied. A single source 2 transmits a wireless signal that is received by a plurality of antennas 5*a-c*. The single source does not need to be the only source of signals, but from the perspective of receiving a wireless signal, the single source 2 is the only source of a particular wireless signal that is received by the plurality of antennas 5*a-c*. The single source can be implemented as an instance of user equipment (UE), and can be, for example, what today are commonly known as a mobile phone, smart phone or a tablet/laptop with wireless connectivity.

The wireless transmission can occur over a cellular communication network that can comply with any one or a combination of 6G, 5G NR (New Radio), LTE (Long Term Evolution), LTE Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

While FIG. 1 is illustrated with three antennas 5*a-c*, the embodiments presented herein can be applied with any number of antennas, as long as there are at least two antennas. The antennas 5*a-c* are provided physically separated, such that some value can be gained by finding a difference or relation between signals received between different antennas. The antennas can be physically separated, but provided on the same device, be different and/or the antennas can be provided in different locations.

Each one of the antennas 5*a-c* is connected to a respective reception point 3*a-c*. The antennas 5*a-c* receive the wireless signals and provide these as respective time-domain signals 7*a-c*, consisting of complex-value samples, to each one of the reception points 3*a-c*. As described in more detail below, each one or the reception points 3*a-c* performs a Fourier-related transform to transform the time-domain signals 7*a-c* to respective frequency-domain signal 6*a-c*.

The frequency-domain signals 6*a-c* contain values of only one part (real or imaginary), despite the input to the transform being complex. The reason for this is to reduce resource requirements for communicating the frequency-domain signals 6*a-c* on a front haul link for subsequent aggregation. Details of this process is provided below. The frequency-domain signals 6*a-c* are then provided to a relation determiner 1 on the fronthaul link.

As explained in more detail below, the relation determiner 1 determines a relation between at least two frequency-domain signals, e.g. phase difference, time difference, power ratio, etc. This relation can be used for positioning the single source 2, e.g. based on multi-alteration of a time-difference on arrival and/or power ratio.

The relation determiner 1 can also be used to aggregate the frequency-domain signals and optionally also to reconstitute a time-domain signal based on the received frequency-domain signals 6*a-c*. Alternatively, aggregation and decoding can be performed by devices after the relation determiner 1.

Figure 2:
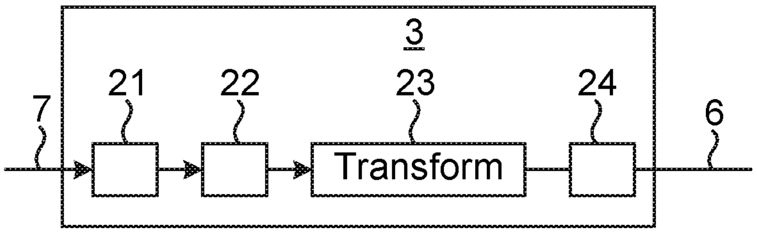
FIG. 2 is a schematic diagram illustrating encoding of data according to some embodiments by a reception point of FIG. 1.

FIG. 2 is a schematic diagram illustrating encoding of data according to some embodiments by a reception point 3 of FIG. 1. There is a single reception point 3 in FIG. 2, representing the actions of each one of a plurality of reception points 3.

The input is a time-domain signal 7, in the form of IQ (in-phase quadrature) samples for a single carrier, or for multiple frequency- and/or time-multiplexed carriers. An input framer 21 arranges the time-domain signal in overlapping frames, for instance 50% overlap (in time). A time-domain window function $a(n)$ is applied by a time-domain window module 22. A transform module 23 applies a Fourier-related transform to transform the signal to the frequency domain, also denoted the transform domain herein. The Fourier-related transform is a transform function related to Fourier analysis and can e.g. be in the form of a Discrete Fourier Transform (DFT), Short-time Fourier transform (STFT), Generalized Discrete Fourier Transform (GDFT), Modified Discrete Cosine Transform (MDCT) and Modified Discrete Sine Transform (MDST). or any other suitable transform, resulting in, for each frame, a number of coefficients provided in respective frequency bins. A frequency-domain window function $W^*(k)$ where k is the frequency bin index, is applied by a frequency-domain window module 24, resulting in a frequency-domain signal 6. The operator * denotes complex conjugate. Optionally, the transform applied in the transform module is configured to include $W^*(k)$ as part of the transform, in which case the separate frequency-domain window module is not needed. In this case, the transform is in the form of a GDFT. The examples described hereinafter are based on the transform module applying a DFT. Other transforms can be applied, but would result in different window functions $W^*(k)$ and $a(n)$.

Embodiments presented herein are based on only one part (real or imaginary) of the coefficients forming part of the frequency-domain signal 6. In the following, for making the description clearer, it is mainly referred to imaginary part being removed, but it is to be noted that the same procedure can be applied for the real part being removed.

The imaginary part of the transform can be discarded as part of the transform, as part of the multiplication with the frequency-domain window $W^*(k)$ or as a separate step. Discarding of the imaginary part is done to achieve data compression, compensating for the overlap in the input framing. For practical use of transform coding, a quantization step is also used for bitrate reduction, but this is omitted herein to improve clarity. Errors due to quantization can be modelled as noise. Another step that can be performed to improve data compression is to omit coefficients lower than a threshold value.

Time difference, phase difference or power ratio between signals can be estimated using cross-correlation. In the time-domain, this involves convolution operations, which implies high computational complexity. Further, for transform coded signals as in embodiments presented herein, each signal would have to be decoded before such a convolution. For signals that are to be combined, this means additional complexity increase since it is no longer sufficient to have a single decoder for the combined signal. Also, information from the correlation can be exploited to improve the combining (e.g. for co-phasing based on time-difference and/or phase-difference estimates, and/or for scaling based on power ratio to achieve Maximal-Ratio Combining). Calculating cross-correlation in the transform frequency domain is problematic since we in embodiments presented herein, only have access to real-valued samples. With a real-valued cross-correlation, there will be aliasing in the time-domain, which means e.g. that it is not possible to tell if a delay difference is positive or negative.

According to embodiments presented herein, a complex cross-correlation is determined, despite only having real-valued samples per frequency bin k.

Mathematical Model

The process correlation of frequency-domain signals according to embodiments presented herein will now be described with more mathematical rigour.

Basic Derivations of Correlations in the Transform Domain

Our time delay estimates in the transform domain are based on the time-domain signals at a first reception point 3*a* and a second reception point 3*b*, indexed 0 and 1 hereinafter, respectively, before the Fourier-related transform, assuming line-of-sight propagation (multipath could be handled at least to some extent by superposition):

$$z_{0,m}(n_0) = a(n_0)\cdot A_0\cdot s(m\cdot M + n_0 - \theta_0)$$

$$z_{1,m+d}(n_1) = a(n_1)\cdot A_1\cdot s((m+d)\cdot M + n_1 - \theta_1)$$

where z is a time-domain signal sample, n is a sample index, $A_0$ and $A_1$ are complex amplitudes of the received signals, s is the transmitted signal, $\theta_0$ and $\theta_1$ are the signal delays, m is the transform frame number, M is the number of samples between start of two adjacent frames. It is to be noted that, for reasons of clarity, we here consider baseband representations of all signals. Hence, there is no RF (Radio Frequency) modulation e.g. in s. The frame shifts, d, is typically ±1 or zero, but could be expanded to other values, as long as there remains any correlation between the two frames, $z_{1,m+d}(n_1)$ and $z_{0,m}(n_0)$. Further, we assume that $WW^*=1$ holds for the frequency-domain window, at least for the set of transform bins k where we have desired signal. Thus, it will disappear in the correlation formulas below.

We first derive the correlation between the complex signals in the transform domain.

$$C_{Zd}(k) = E\{Z_{1,m+d}(k)\cdot Z^*_{o,m}(k)\} = A_1\cdot A_0^*\cdot \sum_{n_1,n_0} a(n_1)\cdot a^*(n_0)\cdot r_s(n_1 - n_0 + d\cdot M - \theta)e^{-i\frac{2\pi}{N}k(n_1-n_0)},$$

where C is the correlation, E is the expected value, k is the transform bin number, $\theta=\theta_1-\theta_0$ and $r_s(\tau)=E\{s(t+\tau)s^*(\tau)\}$, since we assume time independent auto correlation of s(t).

Changing one summation variable to be $n=(n_1-n_0+d\cdot M-\theta)$ gives $$C_{Zd}(k) = A_1\cdot A_0^*\cdot \sum_{n,n_0} a(n_0+n+\theta-d\cdot M)\cdot a^*(n_0)\cdot r_s(n)e^{-i\frac{2\pi}{N}k(n+\theta-d\cdot M)} = A_1\cdot A_0^*\cdot \sum_{n,n_0} h_a(n_0+n+\theta-d\cdot M)\cdot h_a(n_0)\cdot v^*(n+\theta-d\cdot M)\cdot r_s(n)e^{-i\frac{2\pi}{N}k(n+\theta-d\cdot M)}$$

where $h_a(n)$ is the magnitude of the time-domain window function a(n). It is to be noted that a in a(n) and in the subscript to h implies that it is the analysis window, i.e. the encoder window. In the last step we have used that the window $a(n)=h_a(n)\cdot v^*(n)$, where $$v(n) = e^{i\frac{\pi}{N}n}.$$

Typically, $h_a(n)$ is a smooth window, such as Kaiser-Bessel-derived, or a Kaiser window, having low sidelobe levels while not too wide main lobe.

Inserting $$e^{i\frac{2\pi}{N}kdM} = (-1)^{kd}$$

and inserting the time correlation for $h_a(n_0)$ as $r_{ha}(\tau)=\Sigma_{n_0}h_a(n_0+\tau)\cdot h_a(n_0)$ gives $$C_{Zd}(k) = (-1)^{kd}\cdot A_1\cdot A_0^*\cdot \sum_n r_{ha}(n+\theta-d\cdot M)\cdot v^*(n+\theta-d\cdot M)\cdot r_s(n)e^{-i\frac{2\pi}{N}k(n+\theta)}$$

Using $$v^*(n+\theta-d\cdot M) = e^{-i\frac{\pi}{N}((n+\theta-d\cdot M)} = i^d\cdot e^{-i\frac{\pi}{N}\cdot(n+\theta)}$$

gives $$C_{Zd}(k) = i^d\cdot(-1)^{kd}\cdot A_1\cdot A_0^*\cdot \sum_n r_{ha}(n+\theta-d\cdot M)\cdot r_s(n)\cdot e^{-i\frac{\pi}{N}(n+\theta)}\cdot e^{-i\frac{2\pi}{N}k(n+\theta)}$$

and after breaking out the dependency of θ we get $$C_{Zd}(k)=i^d\cdot(-1)^{kd}\cdot e^{-i\frac{\pi}{N}(2k+1)\theta}\cdot A_1\cdot A_0^*\cdot\sum_n r_{ha}(n+\theta-d\cdot M)\cdot r_s(n)\cdot e^{-i\frac{\pi}{N}(2k+1)n}.$$

We now use double length for the DFT, $N_2=2\cdot N$, since the length of the time data is essential doubled, due to the correlation expression $r_{ha}(\tau)$:

$$C_{Zd}(k)=\left\{i^d\cdot(-1)^{kd}\cdot e^{-i\frac{2\pi}{N_2}k_1\theta}\cdot A_1\cdot A_0^*\cdot\sum_n r_{ha}(n+\theta-d\cdot M)\cdot r_s(n)e^{-i\frac{2\pi}{N_2}k_1 n}\right\}_{k_1=2k+1},$$

where we only use odd $k_1=2k+1$, but for the analysis we may need all $k_1$.

The sum is a DFT of the product $r_{ha}(n+\theta-d\cdot M)\cdot r_s(n)$, which corresponds to a convolution in the frequency domain $$C_{Zd}(k)=i^d\cdot(-1)^{kd}\cdot e^{-i\frac{2\pi}{N_2}k_1\theta}\cdot A_1\cdot A_0^*\cdot R_{ha(n+\theta-d\cdot M)}(k_1)*R_s(k_1),$$

where $R_s(k_1)=\text{dft}(r_s(n),N_2)$ and $R_{ha(n+\theta-d\cdot M)}(k_1)=\text{dft}(r_{ha}(n+\theta-d\cdot M),N_2)$.

Since $R_s(k_1)$ is slowly varying in the passband and $R_{ha(n+\theta-d\cdot M)}(k_1)$ essentially is concentrated around $k_1=0$, we might use the approximation $$C_{Zd}(k)\approx i^d\cdot(-1)^{kd}\cdot e^{-i\frac{2\pi}{N_2}k_1\theta}\cdot A_1\cdot A_0^*\cdot r_{ha}(dM-\theta)\cdot R_s(2k+1).$$

The Correlations of the Real Parts in the Transform Domain

We get the correlation from only the real parts of the frequency data as $$C_{Xd}(k)=E\{X_{1,m+d}(k)\cdot X_{0,m}^*(k)\}=\frac{\text{Re}[E\{Z_{1,m+d}(k)\cdot Z_{0,m}^*(k)\}]}{2}=\frac{\text{Re}[C_{Zd}(k)]}{2},$$

since X and Y are assumed uncorrelated and both having the same statistics.

Using the approximation in the last step in the previous section, we get the following:

Specifically, for d=1, −1 and 0, we have the correlations that are available from the real parts in the transform domain $$\begin{cases} C_{X1}(k)=-\dfrac{(-1)^k\cdot\sin\left(\frac{2\pi}{N}k\theta\right)}{2}\cdot A_1\cdot A_0^*\cdot[R_{ha(n+\theta-M)}(k_1)*R_s(k_1)]_{k_1=2k+1}\\ C_{X-1}(k)=\dfrac{(-1)^k\cdot\sin\left(\frac{2\pi}{N}k\theta\right)}{2}\cdot A_1\cdot A_0^*\cdot[R_{ha(n+\theta+M)}(k_1)*R_s(k_1)]_{k_1=2k+1}\\ C_{X0}(k)=-\dfrac{\cos\left(\frac{2\pi}{N}k\theta\right)}{2}\cdot A_1\cdot A_0^*\cdot[R_{ha(n+\theta)}(k_1)*R_s(k_1)]_{k_1=2k+1}\end{cases}$$

which can be approximated as $$\begin{cases} C_{X1}(k)\approx-\dfrac{(-1)^k\cdot\sin\left(\frac{2\pi}{N}k\theta\right)}{2}\cdot A_1\cdot A_0^*\cdot r_{ha}(M-\theta)\cdot R_s(2k+1)\\ C_{X-1}(k)\approx\dfrac{(-1)^k\cdot\sin\left(\frac{2\pi}{N}k\theta\right)}{2}\cdot A_1\cdot A_0^*\cdot r_{ha}(-M-\theta)\cdot R_s(2k+1)\\ C_{X0}(k)\approx\dfrac{\cos\left(\frac{2\pi}{N}k\theta\right)}{2}\cdot A_1\cdot A_0^*\cdot r_{ha}(-\theta)\cdot R_s(2k+1)\end{cases}$$

respectively, where we also included the approximation from above.

Selecting Reference Signal

The expressions in the previous section were calculated for correlations between signal 1 and signal 0, assuming that signal 0 was the reference. The power of signal 0 and 1 per frequency bin k we calculate in the same manner as $$P_{X0}(k)=E\{X_{0,m}(k)\cdot X_{0,m}^*(k)\}=\frac{1}{2}\cdot A_0\cdot A_0^*\cdot[R_{ha(n)}(k_1)*R_s(k_1)]_{k_1=2k+1}\approx\frac{1}{2}\cdot A_0\cdot A_0^*\cdot r_{ha}(0)\cdot R_s(2k+1)$$

$$P_{X1}(k)=E\{X_{1,m}(k)\cdot X_{1,m}^*(k)\}\approx\frac{1}{2}\cdot A_1\cdot A_1^*\cdot r_{ha}(0)\cdot R_s(2k+1)$$

Selecting a proper reference signal may matter if some type of signal-based normalization is applied (discussed in the next section) to the cross-correlation or if more than two signals are involved. With more than two signals, it can be useful to use the same reference signal in all cross-correlations. Selection of reference signal could be done e.g. by choosing the one with the highest SNR (Signal to Noise Ratio) (if known), largest power (since this is likely to be the least noisy), or by selecting the one with the flattest spectrum (indicating that it is close to line-of-sight and might give the least distortion of results).

Scaling Factors for the Correlations of the Real Parts in the Transform Domain

In some cases, it may be an advantage to normalize the correlation expressions with a denominator D(k), e.g. if the spectrum of the transmitted signal is not completely flat, if there is amplitude/phase variation in the receiver chain, or if we want to determine power ratio or phase difference between signals. One option is to normalize the correlation expressions with a denominator based on the reference signal, e.g. $D(k)=P_{X0}(k)$ to get $$\begin{cases} Q_{+1}(k)=-C_{X1}(k)/P_{X0}(k)\approx-(-1)^k\cdot\dfrac{A_1}{A_0}\cdot\sin\left(\frac{2\pi}{N}k\theta\right)\cdot\rho_{ha}(M-\theta)\\ Q_{-1}(k)=C_{X-1}(k)/P_{X0}(k)\approx(-1)^k\cdot\dfrac{A_1}{A_0}\cdot\sin\left(\frac{2\pi}{N}k\theta\right)\cdot\rho_{ha}(-M-\theta)\\ Q_0(k)=C_{X0}(k)/P_{X0}(k)\approx\dfrac{A_1}{A_0}\cdot\cos\left(\frac{2\pi}{N}k\theta\right)\cdot\rho_{ha}(-\theta)\end{cases}$$

where $$\rho_{ha}(\tau)=\frac{r_{ha}(\tau)}{r_{ha}(0)}$$

is the normalized correlation sum of $h_a(n_0)$. Here, the normalized cross-correlations will contain the ratio of the complex amplitudes for signal 1 and signal 0 (the reference). As can be seen above, the normalized cross-correlations depend on delay-, phase- and power (dB) difference between the signals and also on $\rho_{ha}(\tau)$. However, there is no longer any dependency on the transmitted signal's power spectrum.

Other normalizations are also possible, e.g. normalization by a scalar value (e.g. the average of $P_{Xo}(k)$ over all relevant k), no normalization (corresponding to normalization by the constant of 1), normalization by a known power spectral density of the transmitted signal, or a normalization involving both signals:

$$D(k)=\sqrt{P_{X0}(k)P_{X1}(k)}$$

The latter normalization would result in $$\begin{cases} Q_{+1}(k) = -C_{X1}(k)/D(k) \approx -(-1)^k \cdot \frac{A_1}{|A_1|} \cdot \frac{A_0^*}{|A_0|} \cdot \sin\left(\frac{2\pi}{N}k\theta\right) \cdot \rho_{ha}(M-\theta) \\ Q_{-1}(k) = C_{X-1}(k)/D(k) \approx (-1)^k \cdot \frac{A_1}{|A_1|} \cdot \frac{A_0^*}{|A_0|} \cdot \sin\left(\frac{2\pi}{N}k\theta\right) \cdot \rho_{ha}(-M-\theta) \\ Q_0(k) = C_{X0}(k)/D(k) \approx \frac{A_1}{|A_1|} \cdot \frac{A_0^*}{|A_0|} \cdot \cos\left(\frac{2\pi}{N}k\theta\right) \cdot \rho_{ha}(-\theta) \end{cases}$$

Here, the normalized cross-correlation does not depend on the magnitude of signal 1 and 0, only on their phase and delay difference. This might be an advantage in some case since it can reduce the impact of any multipath propagation in the respective signals 0 and 1. A further advantage is that it may reduce the impact of any difference in amplitude ripple in the receiver signal chains for signal 0 and 1. However, it cannot remove the impact of the channel completely and a potential problem with using signal-dependent normalization such as the above is that we may experience noise enhancement for transform bins with low power.

If signal 1 is weak or noisy, the normalization $D(k)=P_{X0}(k)$ shown earlier may be preferred, especially if the reference signal 0 was chosen as the strongest and/or the one with flattest spectrum. Still, a problem is that $P_{X0}(k)$ may contain e.g. thermal noise. This will create a bias in the result since we would normalize by a value that is too large. The error becomes worse for low SNR. If the average noise level is known, e.g. from receiver noise figure and known gain from analog to digital, average noise power can be subtracted from D(k) before normalization. Although this subtraction removes the bias, we still have different noise for different k in D(k), which may cause degraded precision in the result. This could partially be mitigated by filtering of D(k), e.g. a moving average over k, which in the extreme case turns D(k) into a scalar value Utilizing the Knowledge of the Spectrum of the Transmitted Signal for Normalization This section describes a method to determine a normalization method in cases where the transmitted signal spectrum is known.

We now create a model for $|X_{0,m}(k)|^2$ by first defining $W_m(k)$ as $$W_m(k) = |X_{0,m}(k)|^2 - P_0 \cdot R_{sha}(k),$$

where $$P_0 = \frac{1}{2} \cdot |A_0|^2$$

$$R_{sha}(k) = dft(r_{ha}(n) \cdot r_s(n), N_2)_{k_1=2k+1}$$

The expected value of $W_m(k)$, $E\{W_m(k)\}=0$ and we define the model for $|X_{0,m}(k)|^2$ as $$|X_{0,m}(k)|^2 = P_0 \cdot R_{sha}(k) + W_m(k) = [R_{ha(n)}(k_1) * R_s(k_1)]_{k_1=2k+1}$$

The expected value of $W_m(k)$, $E\{W_m(k)\}=E\{X_{0,m}(k)|^2\}-P_0 \cdot R_{sha}(k)=0$.

We assume that we have additive noise, $N_m(k)$, in our measurements of $X_{0,m}(k)$. It means that this noise will appear in $|X_{0,m}(k)|$ with a corresponding mean value, e.g. $P_N$ We define the model for $|X_{0,m}(k)|^2$ as $$\left|\hat{X}_{0,m}(k)\right|^2 = P_0 \cdot R_{sha}(k) + P_N \cdot R_N(k) + V_m(k)$$

where $V_m(k)=W_m(k)+N_m(k)$ and $R_N(k)=1$, to start with, with the aim to estimate $P_0$ and $P_N$ to get an estimate of $P_{X0}(k)$. We minimize the mean square error $$\sum_{m,k}\left|\left|\hat{X}_{0,m}(k)\right|^2 - P_0 \cdot R_{sha}(k) + P_N\right|^2$$

or in matrix form $$\left|y - H \cdot \begin{bmatrix} P_0 \\ P_N \end{bmatrix}\right|^2,$$

where y is a column vector with $|X_{0,m}(k)|^2$ for all m and k, that we want to base our estimates on. The two columns of H contain $R_{sha}(k)$ and ones respectively, corresponding to each element in y.

The resulting estimated values of $P_0$ and $P_N$, $\hat{P}_0$ and $\hat{P}_N$ respectively, $$\begin{bmatrix} \hat{P}_0 \\ \hat{P}_N \end{bmatrix} = (H^* \cdot H)^{-1} \cdot H^* \cdot y = H\backslash y$$

are now used to form an estimate of $P_{X0}(k)$, $$\hat{P}_{X0}(k) = \hat{P}_0 \cdot R_{sha}(k) + \hat{P}_N$$

Here, we would use normalization denominator $D(k)=\hat{P}_{X0}(k)-\hat{P}_N=\hat{P}_0 \cdot R_{sha}(k)$, which does not contain any noise that varies with k. This method is especially beneficial when the reference signal has low SNR.

Estimation of $A_1/A_0$ and/or θ Based on Kept Transform Domain Data

In this section, it is assumed that normalization is done by $D(k)=P_{X0}(k)$ but it should be straightforward to modify the formulas if any other normalization is desired, e.g. the average of $P_{X0}(k)$ over all k where the desired signal is present.

First Method

We have access to sequences of frames $X_{0,m}(k)$ and $X_{1,m}(k)$, which we utilize to estimate $C_{Xd}(k)=E\{X_{1,m+d}(k) \cdot X_{0,m}{}^*(k)\}$ as an average over multiple frames (when available)

$$\hat{C}_{Xd}(k) = \sum_m w_m \cdot X_{1,m+d}(k) \cdot X_{0,m}^*(k)$$

where $w_m$ is an averaging weight for frame m, $\Sigma_m W_m \underline{\underline{\mathrm{def}}} 1$, and $P_{X0}(k)=E\{X_{0,m}(k)\cdot X_{0,m}^*(k)\}$ as $$\hat{P}_{X0}(k) = \sum_m w_m \cdot X_{0,m}(k) \cdot X_{0,m}^*(k) = \sum_m w_m \cdot |X_{0,m}(k)|^2.$$

Typically, the weights $w_m$ would be the same for all frames, resulting in an arithmetic mean over the frames, but it is also possible to use different weights, e.g. reduced weights for the first and last frames if the wanted signal does not start exactly on a frame boundary, or higher weights for frames with higher signal-to-noise ratio (SNR) if SNR estimates are available.

The corresponding normalized estimates we get as $$\begin{cases} \hat{Q}_{+1}(k) = -\hat{C}_{X1}(k)/\hat{P}_{X0}(k) \approx -(-1)^k \cdot \dfrac{A_1}{A_0} \cdot \sin\left(\dfrac{2\pi}{N}k\theta\right) \cdot \rho_{ha}(M-\theta) \\ \hat{Q}_{-1}(k) = \hat{C}_{X-1}(k)/\hat{P}_{X0}(k) \approx (-1)^k \cdot \dfrac{A_1}{A_0} \cdot \sin\left(\dfrac{2\pi}{N}k\theta\right) \cdot \rho_{ha}(-M-\theta) \\ \hat{Q}_0(k) = \hat{C}_{X0}(k)/\hat{P}_{X0}(k) \approx \dfrac{A_1}{A_0} \cdot \cos\left(\dfrac{2\pi}{N}k\theta\right) \cdot \rho_{ha}(-\theta) \end{cases}$$

Then we estimate e.g. θ by utilizing the equations $$\begin{cases} \dfrac{A_1}{A_0} \cdot \sin\left(\dfrac{2\pi}{N}k\theta\right) \approx -\dfrac{\hat{Q}_{+1}(k)}{(-1)^k \cdot \rho_{ha}(M-\theta)} \\ \dfrac{A_1}{A_0} \cdot \sin\left(\dfrac{2\pi}{N}k\theta\right) \approx \dfrac{\hat{Q}_{-1}(k)}{(-1)^k \cdot \rho_{ha}(-M-\theta)} \\ \dfrac{A_1}{A_0} \cdot \cos\left(\dfrac{2\pi}{N}k\theta\right) \approx \dfrac{\hat{Q}_0(k)}{\rho_{ha}(-\theta)} \end{cases}$$

From the above, we see that $\hat{Q}_0$ (k) can only give us the absolute value of the delay difference θ, since cos(β)=cos(−β). We also note that either of $\hat{Q}_{+1}(k)$ or $\hat{Q}_{-1}(k)$ is in principle sufficient to determine the delay difference. However, typically $\rho_{ha}(M) \ll \rho_{ha}(-\theta) \approx 1$, in which case solving for 0 using $\hat{Q}_{+1}(k)$ or $\hat{Q}_{-1}(k)$ uses a large scale-factor, amplifying any noise in the estimates. It is expected that more accurate estimation is possible by utilizing all three terms above.

The normalized complex cross-correlation estimate between signals 0 and 1 can now be written as $$\hat{Q}_Z(k) = \frac{\hat{Q}_0(k)}{\rho_{ha}(-\theta)} + \frac{i}{2\cdot(-1)^k}\left(\frac{\hat{Q}_{-1}(k)}{\rho_{ha}(M-\theta)} - \frac{\hat{Q}_{+1}(k)}{\rho_{ha}(-M-\theta)}\right) \approx \frac{A_1}{A_0}\left\{\cos\left(\frac{2\pi}{N}k\theta\right) + i\,\sin\left(\frac{2\pi}{N}k\theta\right)\right\} = \frac{A_1}{A_0}e^{\frac{i2\pi}{N}k\theta}.$$

In principle, this could be solved using numerical methods to get e.g.

$$\frac{A_1}{A_0}$$

or θ. However, with noisy estimates and/or multipath, alternative methods might give more precise results; in time domain, the exponential function above corresponds to a pulse with complex amplitude $$\frac{A_1}{A_0},$$

delayed by θ samples. Thus, one method to determine $$\frac{A_1}{A_0}$$

and/or θ is to window $\hat{Q}_z(k)$ with some common window (e.g. rectangular, Hamming, Hanning, Kaiser etc.), transform it to time domain with inverse DFT and use a peak finding method, possibly including interpolation, to estimate the desired quantities (delay difference, phase difference, and/or magnitude ratio).

One issue with the above formula is that scaling of the real and imaginary parts depend on the delay difference θ, which is unknown. This can be solved in different ways. A first method is to transform the three terms $\hat{Q}_{-1}(k)$, $\hat{Q}_{+1}(k)$, and $\hat{Q}_0(k)$ separately into time (delay) domain, and use delay-dependent scaling according to the formulas above before combining the terms to a complex cross-correlation estimate. This scaling would be correct at (and near) the true peak location (delay θ), but incorrect otherwise. Since scaling varies with delay, there could be false peaks at large delays due to noise enhancement.

A second method is to use the following approximations. For symmetric $\rho_{ha}$ and small |θ|, we have that $$\rho_{ha}(M-\theta) + \rho_{ha}(-M-\theta) = \rho_{ha}(M-\theta) + \rho_{ha}(M+\theta) \approx 2\cdot\rho_{ha}(M),$$

and that $\rho_{ha}(-\theta) \approx 1$ which yields the following expressions for the imaginary and real part respectively $$\begin{cases} \mathrm{Im}\{\hat{Q}_z(k)\} \approx \dfrac{\hat{Q}_{-1}(k) - \hat{Q}_{+1}(k)}{(-1)^k \cdot 2 \cdot \rho_{ha}(M)} = \\ \dfrac{\sum_m w_m \cdot (X_{1,m-1}(k) - X_{1,m+1}(k)) \cdot X_{0,m}^*(k)}{(-1)^k \cdot 2 \cdot \rho_{ha}(M) \cdot D(k)}, \\ \mathrm{Re}\{\hat{Q}_z(k)\} \approx \dfrac{\sum_m w_m \cdot X_{1,m}(k) \cdot X_{0,m}^*(k)}{\rho_{ha}(-\theta)\cdot D(k)} \approx \\ \dfrac{\hat{Q}_0(k)}{\rho_{ha}(-\theta)} \approx \hat{Q}_0(k) \end{cases}$$

where the last step for the imaginary part is an alternative that will reduce the number of multiplications by subtracting the signals from previous and next frame before multiplication. Since all X are real, the conjugate operators (*) can be dropped. The scaling above for the real and imaginary parts is correct at (and near) zero delay. It should work well in many cases where signals of interest typically have small delay difference. If signals have large delay difference, one of them is typically very weak, which means that it may not be desirable to include it in signal combining or UE positioning calculation and thus it doesn't matter if the estimate is less accurate for such cases.

Second Method with Expressions that Only Need Data from Two Adjacent Frames:

A potential drawback with the expressions for the imaginary part above is that data is needed from three different frames: the current frame for the reference signal, the previous and the next frame for the other signal. One embodiment might thus be to use the following expression to determine the imaginary part, which only requires data from two frames (current and previous) for both the reference and the other signal(s). As before, averaging can be done if data from more frames are available.

$$\begin{cases} \mathrm{Im}\{\hat{Q}_z(k)\} \approx \dfrac{\hat{Q}_{-1}(k) - \hat{Q}_{+1}(k)}{(-1)^k \cdot 2 \cdot \rho_{ha}(M)} = \\ \dfrac{\sum_m w_m \cdot X_{1,m-1}(k) \cdot X_{0,m}^*(k) - \sum_m w_m \cdot X_{1,m}(k) \cdot X_{0,m}^*(k)}{(-1)^k \cdot 2 \cdot \rho_{ha}(M) \cdot D(k)}, \\ \mathrm{Re}\,\{\hat{Q}_z(k)\} \approx \dfrac{\hat{Q}_0(k)}{\rho_{ha}(-\theta)} \approx \hat{Q}_0(k) \end{cases}$$

Based on the expression above, an interesting interpretation can be made, where, for our correlation purposes, the current frame is used as a real part, and the previous frame is used as an imaginary part: For each signal (e.g. signal 0 and 1), form an intermediate signal with the real part as the received (real-valued) coefficients for the current frame, and the imaginary part as the received (real-valued) coefficients for the previous frame:

$$\begin{cases} U_{0,m}(k) = X_{0,m}(k) + jX_{0,m-1}(k) \\ U_{1,m}(k) = X_{1,m}(k) + jX_{1,m-1}(k) \end{cases}$$

Cross-correlation of the intermediate signals gives $$\begin{aligned} \hat{C}_{U,10}(k) = \\ E\{U_{1,m}(k)U_{0,m}^*(k)\} = [X_{1,m}(k) + j \cdot X_{1,m-1}(k)]\,[X_{0,m}(k) - j \cdot X_{0,m-1}(k)] = \\ E\{X_{1,m}(k) \cdot X_{0,m}(k)\} + E\{X_{1,m-1}(k) \cdot X_{0,m-1}(k)\} + \\ j \cdot (E\{X_{1,m-1}(k) \cdot X_{0,m}^*(k)\} - E\{X_{1,m}(k) \cdot X_{0,m-1}^*(k)\}) \end{aligned}$$

which can be rewritten as $$\begin{cases} \mathrm{Re}\left[\hat{C}_{U,10}(k)\right] = \sum_m w_m \cdot X_{1,m}(k) \cdot X_{0,m}^*(k) + \sum_m w_{m-1} \cdot X_{1,m-1}(k) \cdot X_{0,m-1}^*(k) \\ \mathrm{Im}\left[\hat{C}_{U,10}(k)\right] = \sum_m w_m \cdot X_{1,m-1}(k) \cdot X_{0,m}^*(k) - \sum_m w_m \cdot X_{1,m}(k) \cdot X_{0,m-1}^*(k) \end{cases}$$

Assuming that all weights $w_m$ are equal, and that the result of the correlation does not change between frame m−1 and frame m, the real part can be further simplified as in the result below $$\begin{cases} \mathrm{Re}\left[\hat{C}_{U,10}(k)\right] = 2\sum_m w_m \cdot X_{1,m}(k) \cdot X_{0,m}^*(k) \\ \mathrm{Im}\left[\hat{C}_{U,10}(k)\right] = \sum_m w_m \cdot X_{1,m-1}(k) \cdot X_{0,m}^*(k) - \sum_m w_m \cdot X_{1,m}(k) \cdot X_{0,m-1}^*(k) \end{cases}$$

It can be observed that this last result closely resembles the earlier shown expression for the desired complex cross-correlation, $\hat{Q}_z(k)$, apart from some scaling. The desired complex cross-correlation is now determined by applying normalization, D(k), and proper individual scaling of the real and imaginary parts from the cross-correlation of the intermediate signals. Similar approximations as before were made.

$$\hat{Q}_z(k) \approx \frac{\mathrm{Re}\left[\hat{C}_{U,10}(k)\right]}{2 \cdot D(k)} + \frac{j \cdot \mathrm{Im}\left[\hat{C}_{U,10}(k)\right]}{(-1)^k \cdot 2 \cdot \rho_{ha}(M) \cdot D(k)}$$

Compared to the previous expression, a factor of ½ was needed for the real part since the real part was here calculated as a sum over two adjacent frames. The expression for the imaginary part is identical to the previous one. As before, the imaginary part has a scale factor $\rho_{ha}(M)$ that depends on the used window in the encoder.

Third Method to Improve Accuracy with Noisy Estimates

Since the imaginary part is noisier than the real part, it can sometimes be preferred to attenuate the imaginary part in the presented expression, as a trade-off between best time-domain alias-cancellation and best signal-to-noise ratio. A further alternative could be to use information from the imaginary part of $\hat{Q}_z(k)$ to determine only the sign of the delay, and use information from the real part to determine accurate position and amplitude estimates. This could work well for line-of-sight propagation. In this case there is no need to scale the real and imaginary parts. However, there could be problems if the delay is too small since the aliasing in the real part could then interfere with the true delay; for a delay of e.g. 3 samples, a time-domain representation of only the real part would show pulses at both +3 and −3 samples. If the pulse is wider than 3 samples, there will be interference affecting accuracy of pulse position and amplitude estimation. Also, if signals are subject to multipath propagation with superposition of multiple different delays, only determining the sign of the delay from the imaginary part might be less accurate than using the full complex cross-correlation.

Figure 3A:
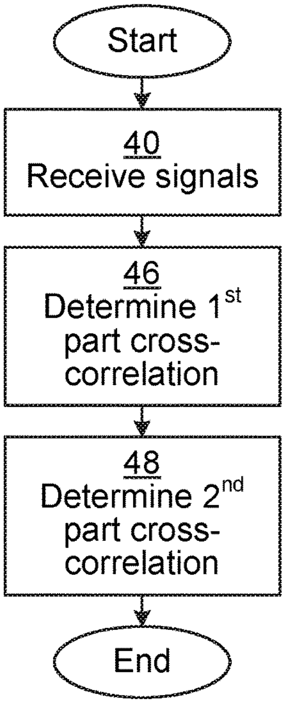
FIGS. 3A-B are flow charts illustrating embodiments of methods for determining a relation between a first time-domain signal and a second time-domain signal received from a single source by different antennas.
Figure 3B:
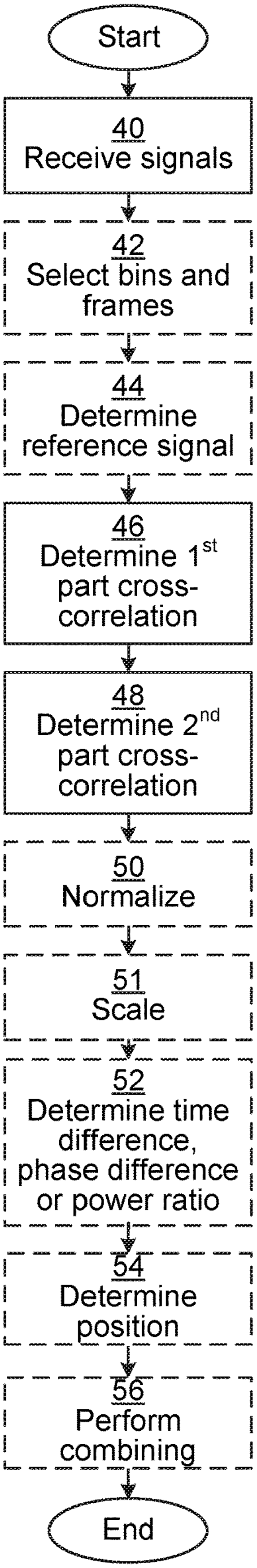

FIGS. 3A-B are flow charts illustrating embodiments of methods for determining a relation between a first time-domain signal 7*a* and a second time-domain signal 7*b* received from a single source by different antennas. As explained above, the time domain signals 7*a-b* are respectively processed with a Fourier-related transform with overlapping input frames to, indirectly or directly, provide respective first and second frequency-domain signals 6*a-b*. The frequency-domain signals are made up of frames of frequency-domain coefficients, wherein only one part, of the real part and the imaginary part of the coefficients from Fourier-related transform, is included in the frequency-domain signals 6*a-b*. When the transform provides the frequency domain signals 6*a-b* directly, the Fourier-related transform can be configured to provide coefficients of only one part (real or imaginary). When the transform provides the frequency domain signals 6*a-b* indirectly, the coefficients can be stripped of one part (real or imaginary) after they are provided as a result of the transform.

A first part is here used to denote the part, real or imaginary, that is included in the frequency-domain signals 6*a-b*. A second part is here used to denote the part, real or imaginary, that is not included in the frequency-domain signals 6*a-b*. Hence, when the first part is the imaginary part, the second part is the real part, or vice versa. The method is performed by the relation determiner 1. First, embodiments illustrated by FIG. 3A will be described.

In a receive signals step 40, the relation determiner 1 receives the first frequency-domain signal 6$a$ and the second frequency-domain signal 6$b$. Optionally, the first frequency-domain signal 6$a$ is received from a first reception device 3$a$ and the second frequency-domain signal 6$b$ is received from a second reception device 3$b$. Optionally, more frequency domain signals can be received by the relation determiner.

In a determine $1^{st}$ part cross-correlation step 46, the relation determiner 1 determines a first part cross-correlation between the first frequency-domain signal 6$a$ and the second frequency-domain signal 6$b$ by cross-correlating corresponding frames in the first frequency-domain signal 6$a$ and the second frequency-domain signal 6$b$, for the first part.

In a determine $2^{nd}$ part cross-correlation step 48, the relation determiner 1 determines a second part cross-correlation between the first frequency-domain signal 6$a$ and the second frequency-domain signal 6$b$ by cross-correlating non-corresponding frames in the first frequency-domain signal 6$a$ and the second frequency-domain signal 6$b$, for the second part. For instance, as explained above, the cross-correlation for the second part is performed for frames where the frame in the first frequency-domain signal 6$a$ is one frame ahead of the frame in the second frequency-domain signal 6$b$, and/or vice versa.

Looking now to FIG. 3B, only new or modified steps compared to FIG. 3A will be described.

In an optional select bins and frames step 42, the relation determiner 1 selects bins and frames to use for the first part cross-correlation and second part cross-correlation based on bins and frames assigned for a particular user. In this way, only data relating to a single user (or more specifically user device) is evaluated, to thereby target the evaluation of cross-correlation for only that user.

In an optional determine reference signal step 44, the relation determiner 1 determines one of the received frequency-domain signals to be used as a reference signal. The reference signal can e.g. be used when there are more than two frequency domain signals. In this case, the receive signal step 40 comprises receiving the first frequency-domain signal 6$a$, the second frequency-domain signal 6$b$ and a third frequency-domain signal 6$c$. Also, steps 46 and 48 then comprises cross-correlating each one of the frequency-domain signals (that is not the reference signal) against the reference signal.

The reference signal can be determined to be the one of the frequency-domain signals that has the greatest received signal power. Alternatively, the reference signal can be determined to be the one of the frequency-domain signals that has the most concentrated autocorrelation or the flattest spectrum.

In an optional normalize step 50, the relation determiner 1 normalizes the first part cross-correlation and the second part cross-correlation on a bin-by-bin basis. The normalising can be performed equally for the first part cross-correlation and the second part cross-correlation.

In an optional scale step 51, the relation determiner 1 scales the first part cross-correlation and/or the second part cross-correlation to enable time-domain alias cancellation. The scaling also allows the control of the trade-off between SNR and amount of alias cancellation.

The scale factor $(-1)^k$ can also be applied to the second part or the first part, but not both, to align pulse positions in the time domain. Otherwise, the pulses from the IDFT (Inverse DFT) of the first and second part will be a half transform size away from each other. Once they are aligned, we get partial alias cancellation, and then the magnitude scaling controls the amount of alias cancellation (and trade-off vs SNR). As mentioned, scaling is optional, e.g. when the imaginary part is used to find the sign of the delay.

In an optional determine time difference, phase difference, or power ratio step 52, the relation determiner 1 determines one or more of a time difference, phase difference, or power ratio, between the first frequency-domain signal 6$a$ and the second frequency-domain signal 6$b$ based on the first part cross-correlation and the second part cross-correlation. The power ratio can be expressed in dB, thus expressing how different or similar two power measurements are.

In an optional determine position step 54, the relation determiner determines a position of the single source based on at least one of the time difference, phase difference and power ratio. For instance, the single source 2 can be positioned based on multi-alteration of a time-difference on arrival and/or power ratio.

In an optional perform combining step 56, the relation determiner performs signal combining based on at least one of the time difference, phase difference and power ratio. As mentioned above, the information from the correlation can be exploited to improve the combining (e.g. for co-phasing based on time-difference and/or phase-difference estimates, and/or for scaling based on power ratio to achieve Maximal-Ratio Combining).

By performing the cross-correlation according to embodiments presented herein, an estimate of both the real part and the imaginary part of the cross-correlation is achieved, even though the input is made up by frequency bin coefficients with only one of the real and imaginary parts. This results in a significantly more efficient determination of cross-correlation between such signals than is known from the prior art.

Figure 4:
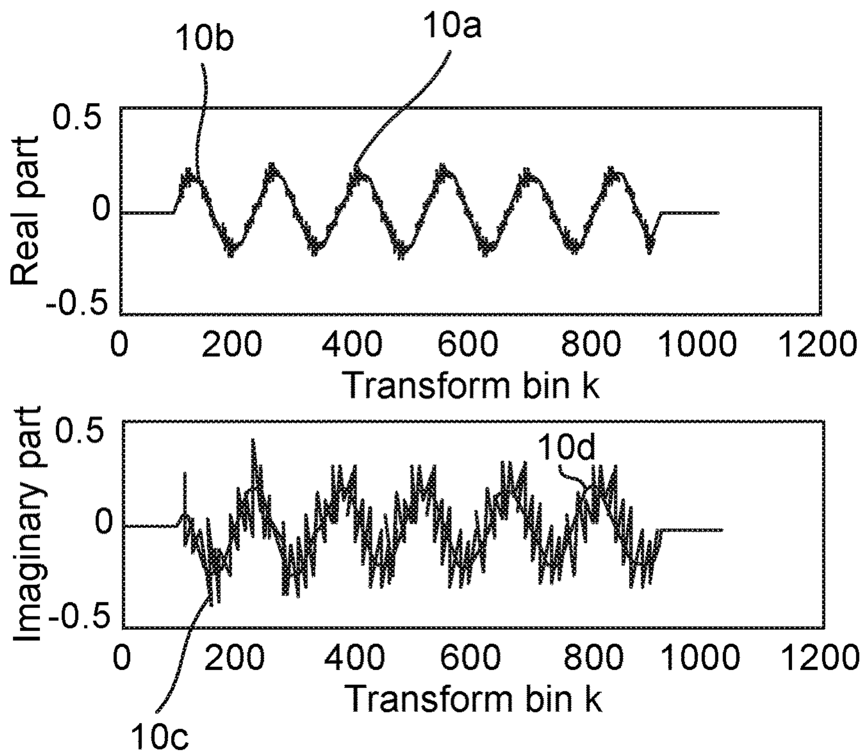
FIG. 4 is a schematic graph illustrating a difference between the real part and the imaginary part of a time-domain signal according to one numerical example.

FIG. 4 is a schematic graph illustrating a difference between the real part and the imaginary part of a time-domain signal according to one numerical example. This example illustrates some results for a 100 MHz wide 5G NR carrier with 30 kHz subcarrier spacing. For the transform coding, we have N=1024, M=512, and the sample rate is 122.88 MHz.

The SNR values for signal 0 and 1 are set to 15 and 0 dB, respectively. Signal 0 is selected as the reference signal. Signal 1 is delayed by 7 samples compared with signal 0 (0=7). We use one slot (14 OFDM (Orthogonal Frequency-Division Multiplexing) symbols) for the correlation calculation. The complex cross-correlation is determined according to the last equation in the section Second method with expressions that only need data from two adjacent frames. After normalization (using average power per bin of the reference signal as denominator), the real and imaginary parts are scaled by multiplying with a scale factor. For the real part, the used scale factor is $1/\rho_{ha}(0)=1$, while for the imaginary part we use $$\frac{1}{(-1)^k \cdot 2 \cdot \rho_{ha}(M)} \approx 3.59 \cdot (-1)^k.$$

These values are calculated from the used time-domain window in the encoder.

The estimated complex correlation after normalization and scaling is shown in FIG. 4. The upper part shows the real part of the estimated cross-correlation, and the lower part shows the imaginary part of the estimated cross-correlation. Bin index numbers are provided along the x axes. In the upper part of FIG. 4, a first line 10$a$ plots the real cross-correlation for each bin index. A second line 10$b$ plots a moving average of the first line. In the lower part of FIG. 4, a third line 10$c$ plots the imaginary cross-correlation for each bin index. A fourth line 10$d$ plots a moving average of the third line.

As can be seen, the bin-by-bin imaginary part is much noisier than the real part, which is expected since we the imaginary part was amplified by a factor 3.59 (~11 dB). However, after filtering (here with moving average, length 19), the sinusoidal wave shape of the imaginary part is evident.

Figure 5:
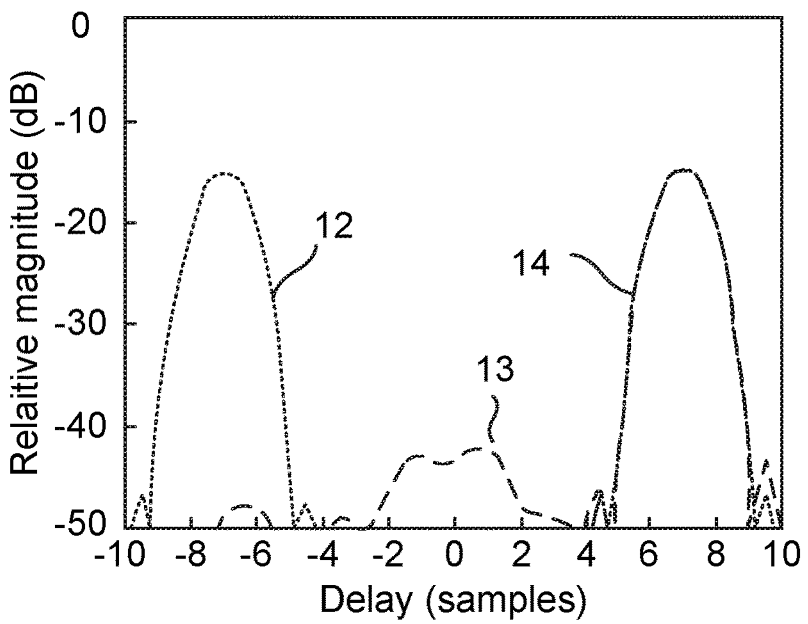
FIG. 5 is a schematic graph illustrating how an estimated cross-correlation is transformed back to time domain.

FIG. 5 is a schematic graph illustrating how an estimated cross-correlation is transformed back to time domain. This follows from the example of FIG. 4.

A Kaiser window is applied on the used bins and the windowed complex cross-correlation is transformed back to time domain using IDFT (Inverse DFT) with oversampling (interpolation). Peaks are then located (position and amplitude). Synchronization errors are not modelled. FIG. 5 clearly shows the image (alias) for negative delays when only the real part 12 of the cross-correlation is used. When the full complex cross-correlation 14 is used, the image is suppressed more than 30 dB. However, the full complex cross-correlation has a higher noise floor, which in this case gives some false (but weak) responses 13 near zero delay.

When such a Monte-Carlo simulation is performed over 200 iterations, the results are shown in Table 1, where delay error is converted to distance error in meters. The result based on embodiments presented herein is compared with a prior art scheme based on time-domain cross-correlation of individually decoded transform coded data streams, and a scheme where the reception point sends both the real and imaginary part to the aggregator (thus using twice the data rate).

TABLE 1

Result comparison

| Distance-estimate error (m) | Time-domain cross-correlation (prior art, much higher complexity) | Complex cross-correlation in transform domain. Both real and imaginary part sent from reception points (twice the fronthaul data rate). | Presented embodiments where the real part of the cross-correlation is used to determine peak location and the imaginary part used to determine the sign of the delay | Presented embodiments with normalized and scaled estimate of complex cross-correlation. |
|---|---|---|---|---|
| Mean | 0.000 | 0.001 | 0.001 | 0.002 |
| Standard deviation | 0.005 | 0.008 | 0.015 | 0.026 |

Two variants of the embodiments are tested. The first is where the imaginary part is only used to determine the sign of the delay, while the real part is used as input to the peak finding. The second is where the full complex cross-correlation is input to the peak finding. As can be seen, the mean error is small in all cases (some random fluctuation). The presented embodiments show larger standard deviation of the distance error, but the error is still below 3 cm. The method of the embodiments where the imaginary part is only used to find the sign of the delay performs better than the method using the full complex values, but the opposite could be true when the delay is close to zero or when there is multipath propagation.

Figure 6:
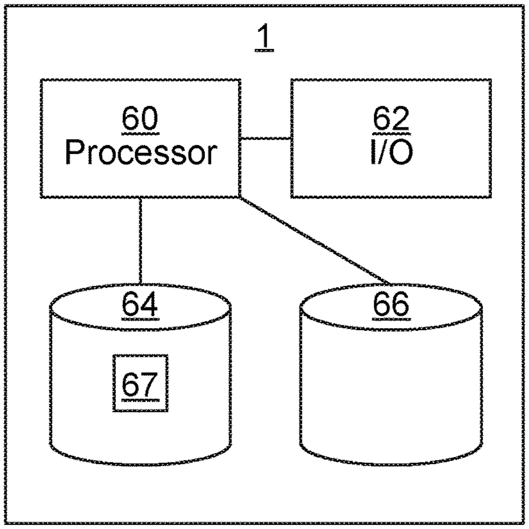
FIG. 6 is a schematic diagram illustrating components of the relation determiner 1 of FIG. 1.

FIG. 6 is a schematic diagram illustrating components of the relation determiner 1 of FIG. 1. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 3A-B above.

The memory 64 can be any combination of random-access memory (RAM) and/or read-only memory (ROM). The memory 64 also comprises non-transitory persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The relation determiner 1 further comprises an I/O interface 62 for communicating with external and/or internal entities.

Other components of the relation determiner 1 are omitted in order not to obscure the concepts presented herein.

Figure 7:
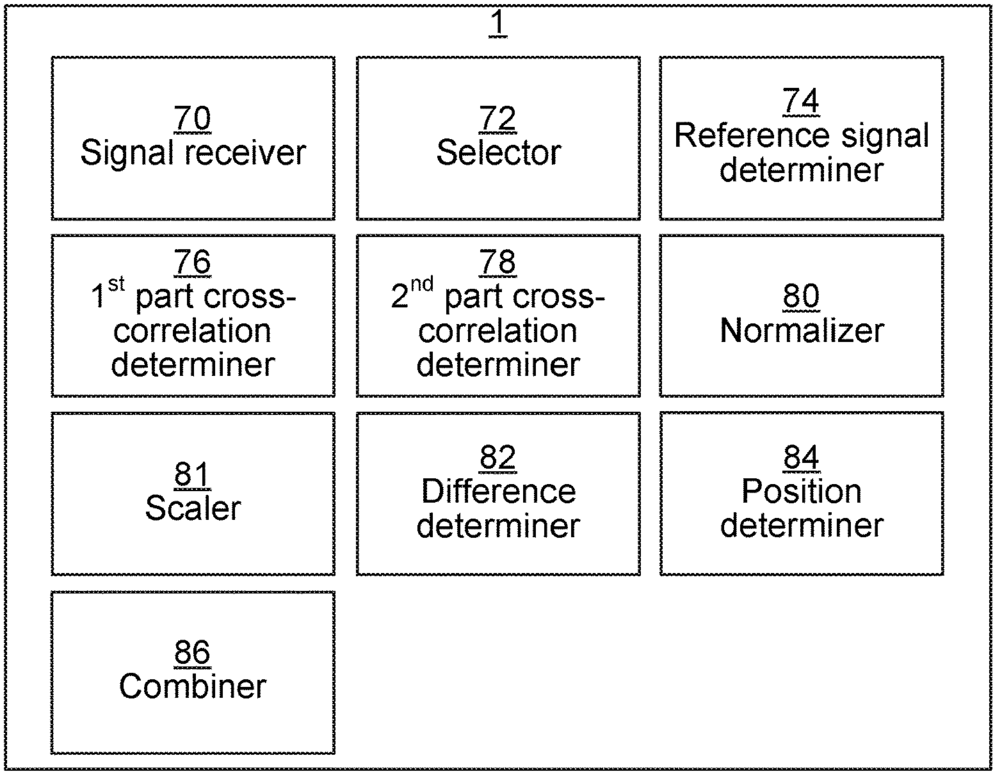
FIG. 7 is a schematic diagram showing functional modules of the relation determiner of FIG. 1 according to one embodiment.

FIG. 7 is a schematic diagram showing functional modules of the relation determiner 1 of FIG. 1 according to one embodiment. The modules are implemented using software instructions such as a computer program executing in the relation determiner 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A-B.

A signal receiver 70 corresponds to step 40. A selector 72 corresponds to step 42. A reference signal determiner 74 corresponds to step 44. A $1^{st}$ part cross-correlation determiner 76 corresponds to step 46. A $2^{nd}$ part cross-correlation determiner 78 corresponds to step 48. A normalizer 80 corresponds to step 50. A scaler 81 corresponds to step 51. A difference determiner 82 corresponds to step 52. A position determiner 84 corresponds to step 54. A combiner 86 corresponds to step 56.

Figure 8:
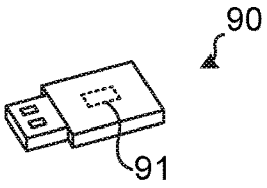
FIG. 8 shows one example of a computer program product comprising computer readable means.

FIG. 8 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 6. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for determining a relation between a first time-domain signal and a second time-domain signal received from a single source by different antennas, wherein the time domain signals are respectively processed with a time-domain to frequency-domain transform function with overlapping input frames to indirectly or directly provide respective first and second frequency-domain signals being made up of frames of frequency-domain coefficients, wherein only one part, of a real part and an imaginary part from the time-domain to frequency-domain transform function, is included in the frequency-domain signals, wherein a first part is the part, real or imaginary, that is included in the frequency-domain signals and a second part is the part, real or imaginary, that is not included in the frequency-domain signals, the method being performed by a relation determiner, the method comprising the steps of:

receiving the first frequency-domain signal and the second frequency-domain signal;

determining a first part cross-correlation between the first frequency-domain signal and the second frequency-domain signal by cross-correlating corresponding frames in the first frequency-domain signal and the second frequency-domain signal, for the first part cross-correlation; and determining a second part cross-correlation between the first frequency-domain signal and the second frequency-domain signal by cross-correlating non-corresponding frames in the first frequency-domain signal and the second frequency-domain signal, for the second part cross-correlation.

2. The method according to claim 1, wherein, in the determining a second part cross-correlation step, the cross-correlation is performed for frames where a frame in the first frequency-domain signal is one frame ahead of a frame in the second frequency-domain signal, and/or vice versa.

3. The method according to claim 1, further comprising the step of:

determining a time difference, phase difference, or power ratio, between the first frequency-domain signal and the second frequency-domain signal based on the first part cross-correlation and the second part cross-correlation.

4. The method according to claim 3, further comprising the step of:

determining a position of the single source based on at least one of the time difference, phase difference and power ratio.

5. The method according to claim 3, further comprising the step of:

performing signal combining based on at least one of the time difference, phase difference and power ratio.

6. The method according to claim 1, further comprising the step of:

selecting bins and frames to use for the first part cross-correlation and second part cross-correlation based on bins and frames assigned for a particular user.

7. The method according to claim 1, further comprising the step of:

determining one of the received frequency-domain signals to be used as a reference signal.

8. The method according to claim 7, wherein the step of receiving comprises receiving the first frequency-domain signal, the second frequency-domain signal and a third frequency-domain signal;

wherein the steps of determining a first part cross-correlation and determining a second part cross-correlation comprises cross-correlating each one of the frequency-domain signals that is not the reference signal against the reference signal.

9. The method according to claim 7, wherein the step of determining a reference signal comprises determining the reference signal to be the one of the frequency-domain signals that has a greatest received signal power.

10. The method according to claim 7, wherein the step of determining a reference signal comprises determining the reference signal to be the one of the frequency-domain signals that has a most concentrated autocorrelation or a flattest spectrum.

11. The method according to claim 1, further comprising the step of:

normalizing the first part cross-correlation and the second part cross-correlation on a bin-by-bin basis.

12. The method according to claim 11, wherein the step of normalizing is performed equally for the first part cross-correlation and the second part cross-correlation.

13. The method according to claim 1, further comprising the step of:

scaling the first part cross-correlation and/or the second part cross-correlation to enable time-domain alias cancellation.

14. The method according to claim 1, wherein the step of receiving the first frequency-domain signal and the second frequency-domain signal comprises receiving the first frequency-domain signal from a first reception device and the second frequency-domain signal from a second reception device.

15. A relation determiner for determining a relation between a first time-domain signal and a second time-domain signal received from a single source by different antennas, wherein the time domain signals are respectively processed with a time-domain to frequency-domain transform function with overlapping input frames to indirectly or directly provide respective first and second frequency-domain signals being made up of frames of frequency-domain coefficients, wherein only one part, of a real part and an imaginary part from the time-domain to frequency-domain transform function, is included in the frequency-domain signals, wherein a first part is the part, real or imaginary, that is included in the frequency-domain signals and a second part is the part, real or imaginary, that is not included in the frequency-domain signals, the relation determiner comprising:

a processor; and a memory storing instructions that, when executed by the processor, cause the relation determiner to:

receive the first frequency-domain signal and the second frequency-domain signal;

determine a first part cross-correlation between the first frequency-domain signal and the second frequency-domain signal by cross-correlating corresponding frames in the first frequency-domain signal and the second frequency-domain signal, for the first part cross-correlation; and determine a second part cross-correlation between the first frequency-domain signal and the second frequency-domain signal by cross-correlating non-corresponding frames in the first frequency-domain signal and the second frequency-domain signal, for the second part cross-correlation.

16. The relation determiner according to claim 15, further comprising instructions that, when executed by the processor, cause the relation determiner to perform the cross-correlation for the second part cross-correlation for frames where the frame in a first frequency-domain signal is one frame ahead of a frame in the second frequency-domain signal, and/or vice versa.

17. The relation determiner according to claim 15, further comprising instructions that, when executed by the processor, cause the relation determiner to:

determine a time difference, phase difference, or power ratio, between the first frequency-domain signal and the second frequency-domain signal based on the first part cross-correlation and the second part cross-correlation.

18. The relation determiner according to claim 17, further comprising instructions that, when executed by the processor, cause the relation determiner to:

determine a position of the single source based on at least one of the time difference, phase difference and power ratio.

19. The relation determiner according to claim 17, further comprising instructions that, when executed by the processor, cause the relation determiner to:

perform signal combining based on at least one of the time difference, phase difference and power ratio.

20. The relation determiner according to claim 15, further comprising instructions that, when executed by the processor, cause the relation determiner to:

select bins and frames to use for the first part cross-correlation and second part cross-correlation based on bins and frames assigned for a particular user.

* * * * *